Feb. 16, 1965  A. WINKLER ETAL  3,169,460
CAMERA WITH ELECTRICAL FILM TRANSPORT
Filed May 21, 1962
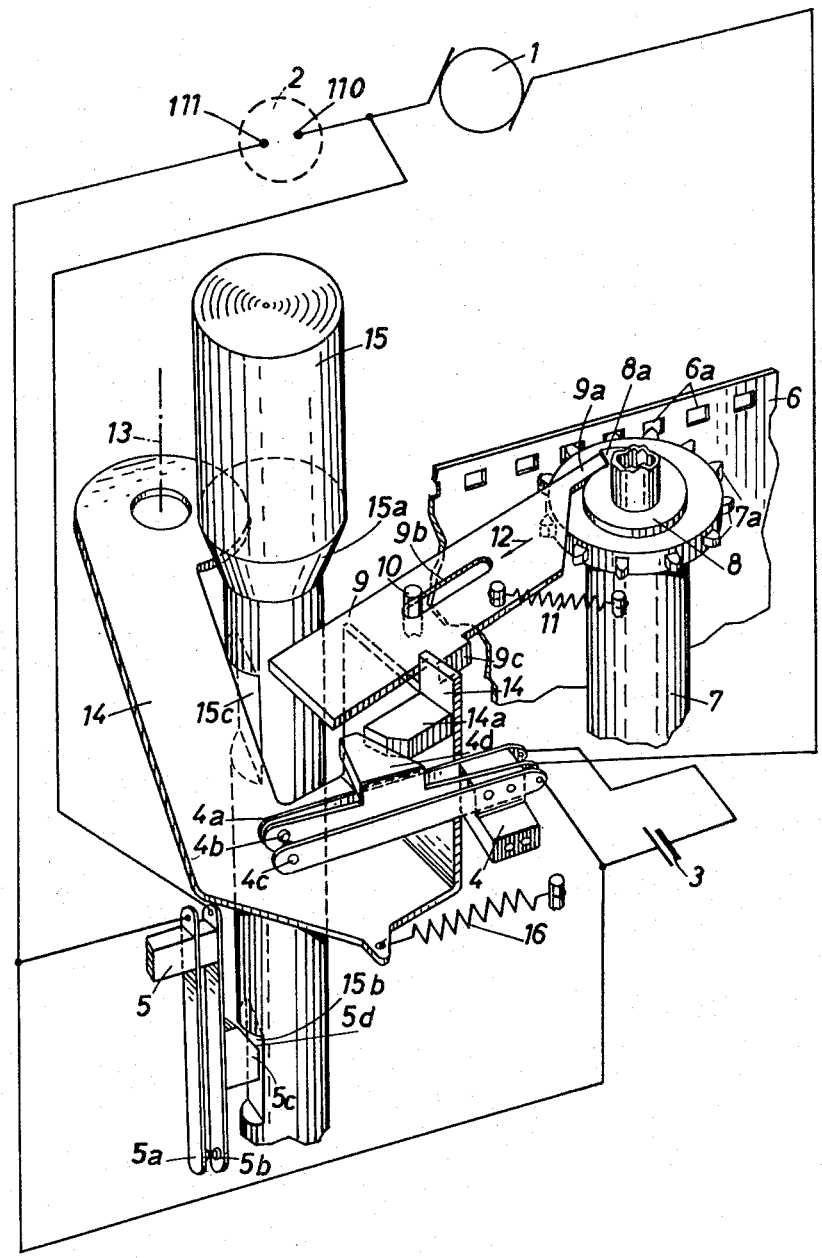
INVENTORS
ALPRED WINKLER
ROLF SCHRÖDER
BY
Michael S. Striker

United States Patent Office 3,169,460
Patented Feb. 16, 1965

3,169,460
CAMERA WITH ELECTRICAL FILM TRANSPORT
Alfred Winkler and Rolf Schröder, Munich, Germany, assignors to Agfa Aktiengesellschaft, Leverkusen-Bayerwerk, Germany
Filed May 21, 1962, Ser. No. 196,110
Claims priority, application Germany, May 20, 1961, A 37,500
6 Claims. (Cl. 95—31)

The present invention relates to cameras.

More particularly, the present invention relates to motor-driven cameras.

In cameras of this latter type it is conventional to provide a cam or the like which cooperates directly with the switch which controls the motor which actuates the film-transporting structure, and as a result whenever such a cam opens the switch the motor stops in order to terminate the transportation of the film.

There are several disadvantages to structure of this type. Thus, for example, there is inevitably a certain amount of inertia in the motor and also the tension of the film itself will vary, so that when the switch is opened in order to stop the motor as a result of the variable tension which is in the film as well as the inertia of the motor the transportation of the film will not be precisely stopped after a predetermined length of the film strip has been transported, and thus precise transportation of the film frame by frame so as to provide frames of equal length is not possible with this conventional structure. Furthermore, because it is required that the cam cooperate with a switch which controls the motor it is also not possible to use with such a structure a double-exposure preventing mechanism.

It is accordingly a primary object of the present invention to provide a motor-driven camera where the motor is used to drive the film-transporting structure with a construction which will guarantee that the film is transported at each cycle through a distance precisely equalling a film frame, so that the frame by frame transportation of the film is very precisely determined.

Another object of the present invention is to provide for a structure of the above type a double-exposure preventing assembly.

Still another object of the present invention is to provide an exceedingly simple and compact construction where the cam which is controlled by the transportation of the film serves not only the function of initiating the controls for the circuit of the electric motor but also the function of controlling the double-exposure preventing assembly.

A still further object of the present invention is to provide a structure of the above type wherein the motor which drives the film-transporting structure will be automatically stopped in its operation when anything unusual occurs to prevent transportation of the film by a distance equal to one film frame, so that as a result of this feature of the invention the battery which supplies the energy for the motor will not be quickly drained of its energy.

An additional object of the present invention is to provide a camera of the above type which may be operated in a conventional manner while at the same time producing all of the above advantages.

With the above objects in view the invention includes, in a camera having a motor-driven film-transporting structure, an electrical circuit in which the motor of the film-transporting structure is located, this circuit including a switch means which controls the circuit and therefor the motor thereof. The camera also includes a double-exposure preventing means as well as a cam means which moves in response to transporting of the film.

A means is actuated by this cam means and cooperates with the switch means as well as with the double-exposure preventing means so as to control both of these latter means, and in this way the single cam means through the structure of the invention is capable of providing control not only of the motor which drives the film-transporting structure but also control of the double-exposure preventing mechanism.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which one possible embodiment of the structure is shown in a diagrammatic perspective view.

As is apparent from the upper part of the drawing, the structure includes the motor 1 indicated diagrammatically in the drawing, this motor driving in a well known manner which forms no part of the present invention a structure which serves to transport the film after each exposure, and since it forms no part of the present invention and is well known in the art this latter structure is not shown in the drawing. An electrical control assembly 2 also diagrammatically shown in the drawing is included in the electrical circuit in which the motor 1 is located, and the purpose of the control assembly 2 is described below. The electrical circuit further includes the battery 3 from which energy is derived for the motor 1, and in the electrical circuit is also located a switch means 4 which includes the spring contact members 4a, 4b and 4c. These spring contact members are insulated from each other and the central contact 4b when not acted upon by an outside force will engage the contact 4a. As is apparent from the drawing, the leads from the battery are respectively connected to the spring contacts 4a and 4c, while the motor is connected to the intermediate spring contact 4b. An additional switch 5, which includes the spring switch members 5a and 5b, is located in the circuit in parallel with the control assembly 2. The spring switch member 5b fixedly carries a switch operating cam 5c provided with an inclined surface 5d for a purpose described below.

The film 6 is fragmentarily illustrated in the drawing, and it will be noted that the perforations 6a thereof receive the teeth 7a of the rotary sprocket wheel 7 which is turned by the transportation of the film through the unillustrated film-transporting structure driven by the motor 1. Fixed coaxially to the wheel 7 is a cam means formed by the cam 8 which has the camming portion 8a. As the end of a transporting cycle of the film 6 is approached the cam 8 moves somewhat beyond the position thereof shown in the drawing, in a counterclockwise direction, as viewed in the drawing, the film 6 being transported to the left, as viewed in the drawing.

The cam means 8 actuates a lever means 9 in the form of an elongated member guided by a stationary pin 10, which extends through an elongated slot 9b of the lever 9, for longitudinal as well as turning movement. A spring 11 is connected at one end to a stationary pin and at its opposite end to a pin which is carried by the lever 9 so as to urge the latter to the right as well as in a clockwise direction around the pin 10, as viewed in the drawing. When the camming portion 8a of the cam 8 acts on the lever means 9, the latter is shifted in the direction of the arrow 12, in opposition to the spring 11, the camming portion 8a engaging the portion 9a of the lever 9.

The structure also includes a double-exposure preventing means, and this latter means is made up in part of an additional lever means 14 supported for rotary movement about the axis 13 which extends parallel to the axis of an elongated rod 15 which forms a manually operable means for tripping the shutter of the camera, this rod 15 being urged upwardly, by an unillustrated spring, to a predetermined starting position from which the rod 15 is depressed downwardly by the operator. A spring 16 is operatively connected to the lever 14 for urging the latter to turn in a counterclockwise direction around the axis 13, as viewed in the drawing, and it will be noted that the manually operable means 15 is formed with a cutout 15c which receives a portion of the lever 14, so that as long as the lever 14 is in the cutout 15c the rod 15 cannot be depressed and an exposure cannot be made, and it is this construction which forms the double-exposure preventing means. In addition, it will be noted that the rod 15 is formed with an elongated cutout 15b which receives the cam 5c which is carried by the switch member 5b, and furthermore the uppermost portion of the rod 15 is provided with a downwardly directed frustoconical surface 15a which during downward movement of the rod 15 will engage first the lever means 9 and then the lever means 14. The lever means 14 carries a projection 14a which cooperates with a projection 4d of the intermediate switch member 4b, and in addition the lever means 9 has a projection 9c which cooperates with the free end portion of the lever 4d, as is apparent from the drawing.

The parts are shown in the drawing in the position they take during normal transportation of the film 6 just before the end of a cycle during which the film 6 is transported by a distance equal to a film frame. At this time the motor is running, and it will be noted that the switch contacts 4a and 4b engage each other so as to complete the circuit from the battery 3 through the motor 1. The switch 5 is open, and the control assembly 2 which is of a known construction, as will be apparent from the description below, does not open the circuit at this time, so that through the switch members 4a, 4b the circuit through the motor 1 is complete and the motor 1 is operating so as to transport the film 6. The cam 8 when it reaches the position shown in the drawing will, by engagement with the portion 9a of the lever 9, shift the latter in the direction of the arrow 12, as pointed out above, in opposition to the spring 11, and the result is that the projection 9c of the lever 9 cooperates with the lever 14 to turn the latter in opposition to the spring 16 in a clockwise direction around the axis 13. This turning of the lever 14 will have two results in accordance with the invention. One of the results is that the projection 14a of the lever 14 cooperates with the projection 4d of the switch member 4b so as to displace the switch means 4 from the motor-operating position thereof shown in the drawing to a short-circuiting position in which the contact 4b moves out of engagement with the contact 4a and engages the contact 4c. Inasmuch as the portion of the circuit where the control means 2 is located is closed, it is apparent that the movement of the contact 4b away from the contact 4a and into engagement with the contact 4c will not only terminate the operation of the motor, but in addition the motor 1 will be short-circuited, and as a result the motor 1 will abruptly stop operating so as to abruptly and precisely terminate the transportation of the film 6 at the end of movement thereof by a single film frame.

The second result accomplished by the shifting of the lever means 9 in the direction of the arrow 12 is the turning of the lever 14 so as to displace it out of the cutout 15c. As long as the lever 14 was in the cutout 15c the manually operable means 15 could not be depressed in order to make a second exposure, and in this way a double-exposure was prevented, but at the end of the movement of a new film frame into position to be exposed the movement of the lever 14 out of the cutout 15c releases the rod 15 for actuation so as to again trip the shutter. During the previous operation of the camera the spring which urged the rod 15 upwardly could only urge it upwardly to the position where the lever 14 enters the cutout 15c, but at the end of the transportation of the next film frame into position the lever 14 is displaced out of the cutout 15c so that the rod 15 now moves upwardly back to its starting position. Thus, in the rest position of the camera the cam 8 maintains the lever 9 displaced in the direction of the arrow 12 beyond the position thereof shown in the drawing, in opposition to the spring 11, in the position where the switch contact 4b engages the contact 4c, so that the motor 1 remains short-circuited, and in the position where the lever 14 is out of the cutout 15c, so that the rod 15 can again be depressed to make the next exposure. At this time the switch 5 remains open, as is apparent from the drawing.

Assuming now that the operator depresses the rod 15 so as to make the next exposure, the rod 15 will move downwardly with the cutout 15c moving below the lever 14 which is maintained out of the cutout 15c by the lever 9 in the manner described above. As the rod 15 is moved downwardly the switch 5 will be closed, since the portion of the rod 15 at the upper end of the cutout 15b will engage the inclined surface 5d so as to displace the contact 5b into engagement with the contact 5a and thus close the switch 5. The control assembly 2 includes a relay-controlled switch which includes a time-delay for a purpose described below and which in addition includes a normally closed switch. The closing of the switch 5 will energize the relay of the assembly 2 so as to open the switch thereof and thus the circuit at the place where the control assembly 2 is located becomes opened by closing of the switch 5, but because the latter is connected in parallel with the assembly 2 the circuit is completed at this time through the switch 5 rather than through the control assembly 2 whose switch is automatically opened by the closing of the switch 5. This switch 5 remains closed during the continued downward movement of the rod 15, and as this rod 15 is moved downwardly its portion 15a will engage the lever 9 so as to turn it about the pin 10 in opposition to the spring 11 in a counterclockwise direction, as viewed in the drawing, so as to displace the end portion 9a of the lever 9 beyond the camming portion 8a, and as soon as this happens the spring 11 immediately shifts the lever 9 in a direction opposite to that indicated by the arrow 12, so that the projection 9c moves away from the lever 14. However, the portion 15a of the rod 15, immediately after engaging the lever 9 so as to turn the latter in a manner described above, engages the lever 14 so that this lever 14 still cannot be moved by the spring 16 to a position where the spring contact 4b can engage the contact 4a. Thus, as the operator continues to move the rod 15 downwardly the lever 14 is maintained in the position where the motor 1 remains short-circuited, and of course the short-circuiting circuit at this time is through the switch 5 rather than through the control assembly 2. Shortly after the portion 15a of the rod 15 engages the lever 14, the downward movement of the rod 15 through only a slight additional distance will trip the shutter in order to make the exposure, and then the operator will release the rod 15 so that it will be returned by its unillustrated spring upwardly toward its starting position.

The upward movement of the rod 15 will release the lever 14 for movement by the spring 16 toward the position shown in the drawing, and as soon as the upper end of the cutout 15c reaches the lever 14 the spring 16 moves the latter to a position where the contact 4b is released for movement by its own inherent springiness into engagement with the contact 4a, and this will result in energizing of the motor 1 so as to start the transportation of the film. It will be noted that substantially simultaneously with the movement of the lever 14 into the cutout 15c, so as to initiate the starting of the motor 1 as well as to prevent it from a double exposure in a manner described above, the cam 5c is received in the cutout 15b, so that the switch 5 opens, and this will result in de-energizing of the relay of the control assembly 2 so that the switch thereof again closes, and thus the circuit is now completed through the control assembly 2 so that the motor 1 continues to operate in order to transport the film. The closing of the switch of the control assembly 2 by the opening of the switch 5 initiates a timing device of the control assembly 2 for a purpose described below, this timing device being well known in the art.

Assuming now that all of the operations proceed normally, the film will again be transported through a distance equal to one film frame, and of course the turning of the cam 8 through one revolution will again cause its camming portion 8a to engage the portion 9a of the lever 9 so as to displace the latter to the left beyond the position shown in the drawing, with the result that the lever 14 is again displaced out of the cutout 15c, enabling the rod 15 to rise to its starting position, and at the same time the lever 14 through its projection 14a places the switch 4 in its short-circuiting position. As long as the contact 4b is displaced into engagement with the contact 4c within a relatively short period of time on the order of two or three seconds after the closing of the switch of the assembly 2 as a result of the opening of the switch 5, the motor operation is simply terminated as soon as the short-circuiting thereof is completed and the switch of the assembly 2 remains closed. These are the operations which will take place normally.

However, it must be remembered that there are times when the film will be incapable of being moved through a complete film frame. For example, when the end of the film strip is reached it very likely will not be possible to transport the film 6 through an entire film frame. Under these conditions if the motor-operating circuit remained closed, which is to say if the contacts 4a and 4b remained in engagement with each other, then the fact that the motor 1 could not continue to turn so as to transport the film would result in very rapid draining of the energy of the battery 3, and it would become necessary to very frequently replace the battery of the camera. In order to prevent such an undesirable result the control assembly 2 has a timing device of well known construction which will automatically open the switch of the control assembly 2 after a period of five seconds, for example, if in the meantime the short-circuiting circuit has not been closed by the displacement of the contact 4b into engagement with the contact 4c. As a result, the automatic opening of the motor circuit if the short-circuiting thereof has not been completed within a predetermined time and in a fully automatic manner results in automatic termination of the transmission of energy to the motor 1 from the battery 3 and as a result the energy of the latter is conserved.

As has been pointed out above, the downward movement of the rod 15 to a given end position will result in tripping of the shutter. This rod 15 may, in a well known manner cock the shutter during its downward movement and then may release the shutter so as to make the exposure when the rod 15 has reached the end of its downward movement, or the structure may be of the type where the shutter is independently cocked and remains cocked until the shutter is tripped by the downward movement of the rod 15 in the manner described above. If desired, the parts may be so arranged that cocking of the shutter, where this takes place separately from movement of the rod 15, is rendered dependent upon transportation of the film, although such an arrangement is of course more complicated than that shown in the drawing and therefore is not preferred.

While the invention has been illustrated and described as embodied in a motor-driven cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be secured by Letters Patent is:

1. In a camera having a motor-driven film transporting structure, in combination, an electrical circuit in which the motor of the motor-driven film transporting structure is located, said electrical circuit including a switch means which controls said circuit; turnable lever means for actuating said switch means; manually operable shutter-tripping means controlled by said lever means to prevent double exposures; cam means moved by transportation of the film; and second lever means actuated by said cam means for acting on said first-mentioned lever means to control said switch means as well as to prevent double exposures.

2. In a camera having a motor-driven film-transporting structure, in combination, an electrical circuit in which the motor of the film-transporting structure is located, said electrical circuit including a switch means; cam means driven by movement of the film by the film-transporting srtucture; manually operable means for tripping the shutter of the camera; first lever means cooperating with said manually operable means to prevent double exposures and cooperating with said switch means to control the latter; second lever means actuated by said cam means and actuating said first lever means to control said switch means and to release said manually operable means for operation when a complete film frame has been transported, said manually operable means when actuated by the operator acting on said second lever means to release the latter from said cam means and to release said first lever means for movement to a position which will control said switch means to energize the motor upon release of said manually operable means after the shutter has been tripped so that an exposure has been made.

3. In a camera having a motor-driven film-transporting structure, in combination, an electrical circuit in which the motor of the film-transporting structure is located, said electrical circuit including a switch means; cam means driven by movement of the film by the film-transporting structure; manually operable means for tripping the shutter of the camera; first lever means cooperating with said manually operable means to prevent double exposures and cooperating with said switch means to control the latter; second lever means actuated by said cam means and actuating said first lever means to control said switch means and to release said manually operable means for operation when a complete film frame has been transported, said manually operable means when actuated by the operator acting on said second lever means to release the latter from said cam means and to release said first lever means for movement to a position which will control said switch means to energize the motor upon release of said manually operable means after the shutter has been tripped so that an exposure has been made, said manually operable means being in the form of an elongated rod formed with a cutout in which said first lever means is received so that said first lever means cooperates with said manually operable means to prevent double exposures.

4. In a camera having a motor-driven film-transporting structure, in combination, an electrical circuit in which the motor of the film-transporting structure is located, said electrical circuit including a switch means movable between a motor-operating position and a motor-short-circuiting position; first lever means operatively connected to said switch means for moving the same between said positions thereof; manually operable means for tripping the shutter of the camera, said manually operable means formed with a cutout which receives a portion of said first lever means so that the latter cooperates with said manually operable means to prevent double exposures; cam means moved by the film during transportation thereof; and second lever means actuated by said cam means and cooperating with said first lever means for moving the latter out of said cutout of said manually operable means and for simultaneously actuating said first lever means to displace said switch means from said motor-operating to said motor-short-circuiting position thereof when said cam means has been moved to a position indicating that a complete film frame has been transported.

5. In a camera having a motor-driven film-transporting structure, in combination, an electrical circuit in which the motor of the film-transporting structure is located, said electrical circuit including a switch means movable between a motor-operating position and a motor-short-circuiting position; first lever means operatively connected to said switch means for moving the same between said positions thereof; manually operable means for tripping the shutter of the camera, said manually operable means being formed with a cutout which receives a portion of said first lever means so that the latter cooperates with said manually operable means to prevent double exposures; cam means moved by the film during transportation thereof; and second lever means actuated by said cam means and cooperating with said first lever means for moving the latter out of said cutout of said manually operable means and for simultaneously actuating said first lever means to displace said switch means from said motor-operating to said motor-short-circuiting position thereof when said cam means has been moved to a position indicating that a complete film frame has been transported, the movement of said first lever means out of said cutout releasing said manually operable means for operation by the operator to make the next exposure, and said manually operable means when actuated to make the next exposure cooperating with said second lever means for moving the same to an inoperative position relative to said cam means and releasing said first lever means for movement back to a position displacing said switch means to said motor-operating position thereof and with said first lever means located in said cutout of said manually operable means.

6. In a camera having a motor-driven film-transporting structure, in combination, an electrical circuit in which the motor of the film-transporting structure is located, said electrical circuit including a switch means movable between a motor-operating position and a motor-short-circuiting position; first lever means operatively connected to said switch means for moving the same between said positions thereof; manually operable means for tripping the shutter of the camera, said manually operable means being formed with a cutout which receives a portion of said first lever means so that the latter cooperates with said manually operable means to prevent double exposures; cam means moved by the film during transportation thereof; second lever means actuated by said cam means and cooperating with said first lever means for moving the latter out of said cutout of said manually operable means and for simultaneously actuating said first lever means to displace said switch means from said motor-operating to said motor-short-circuiting position thereof when said cam means has been moved to a position indicating that a complete film frame has been transported, the movement of said first lever means out of said cutout releasing said manually operable means for operation by the operator to make the next exposure, and said manually operable means when actuated to make the next exposure cooperating with said second lever means for moving the same to an inoperative position relative to said cam means and releasing said first lever means for movement back to a position displacing said switch means to said motor-operating position thereof and with said first lever means located in said cutout of said manually operable means; and spring means operatively connected to said first lever means for urging the same into said cutout of said manually operable means when the latter returns toward a predetermined starting position, said spring means when moving said first lever means into said cutout controlling through said first lever means said switch means for movement to said motor-operating position thereof.

References Cited by the Examiner
UNITED STATES PATENTS 2,969,722   1/61   Schwartz _____ 95—31
3,007,385  11/61   Fukuoka _____ 95—31

EVON C. BLUNK, *Primary Examiner.*